Jan. 20, 1970   H. J. VON KESZYCKI   3,490,566
ANTI-SKID BRAKE CONTROL
Filed Aug. 1, 1967   2 Sheets-Sheet 1

INVENTOR.
HARALD J. VON KESZYCKI
BY Roger A. Marrs
Agent

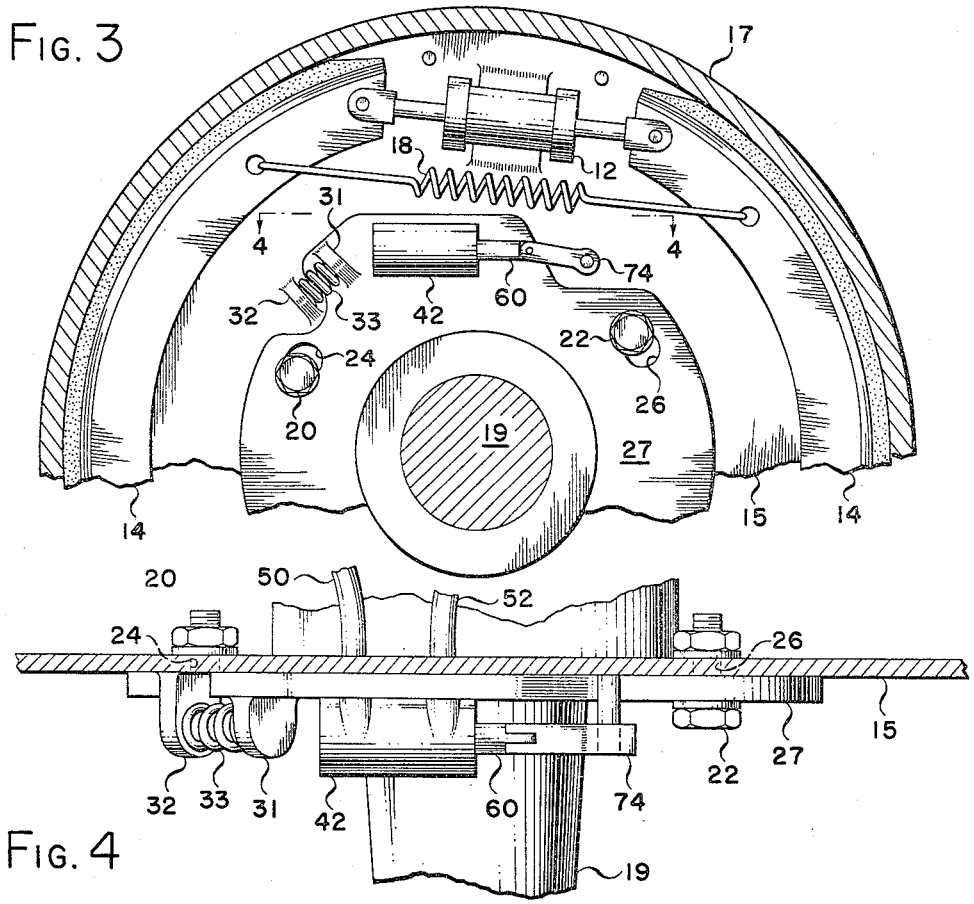
Fig. 3
Fig. 4
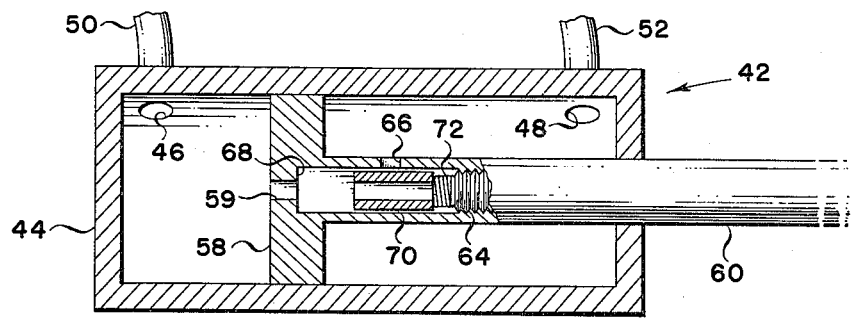
Fig. 5
INVENTOR.
HARALD J. VON KESZYCKI
BY Roger A. Marrs
Agent

United States Patent Office 3,490,566
Patented Jan. 20, 1970

3,490,566
ANTI-SKID BRAKE CONTROL
Harald J. Von Keszycki, Los Angeles, Calif.
(5220 Collier Place, Woodland Hills, Calif. 91364)
Filed Aug. 1, 1967, Ser. No. 657,569
Int. Cl. B60t 8/06, 8/12
U.S. Cl. 188—181                 7 Claims

ABSTRACT OF THE DISCLOSURE

An automatic anti-skid brake control mechanism for temporarily releasing the wheel brake of a skidding vehicle. A change in braking torque produced by the sudden transition of the vehicle wheel from the rotating to the skidding condition is sensed by a brake backing plate which is operably connected to a valve control mechanism via a movably mounted piston disposed therein. The piston includes a hollow piston rod portion through which hydraulic fluid must pass to the vehicle brake cylinders. Movement of the brake backing plate and piston cause a sleeve located within the hollow piston rod to temporarily cover the fluid output port defined by the piston rod and thereby restrict fluid flow to the brake cylinder causing release of the brakes.

BACKGROUND OF THE INVENTION

Field of the invention

This invention relates to a vehicle anti-skid brake control device and more particularly to a mechanism for reducing the brake pressure applied to a brake upon the occurrence of conditions indicative of skidding.

Description of the prior art

Control of a vehicle as it is started, stopped or in making turns depends almost entirely upon the friction in the areas where the tires are in contact with the road or runway. Without friction between the tires and the supporting surface, a vehicle will not respond in the usual way to the steering mechanism, to the accelerator or to the brake. When the tread on the vehicle's tires is good, and the supporting surface dry and smooth, there is a high degree of friction, and te vehicle can be operated to move in a predictable way so that the driver or pilot can control the vehicle.

Oftentimes, a vehicle is in motion which tends to skid instead of stop when the brakes are applied. Such lack of vehicle response when the operator actuates the braking control is the result of insufficient friction between the tires and the supporting surface.

Not only does the vehicle move forward by means of friction, but it also stops by means of friction. When the operator depresses the brake pedal to apply the brakes, the linings of the brake shoes are forced against the brake drums in the wheels. The friction of the brake linings against the drums slows the rotation of the vehicle wheels and thereby increases the friction between tires and the supporting surface such that the vehicle will decelerate and stop.

The efficiency of the vehicle's brakes depends on the friction between the brake lining and the brake drum. If the brakes are applied too strongly or too suddenly such as under emergency or panic conditions, the friction between the brake lining and the brake drum is so much greater than the friction between the tires and the pavement that the vehicle's tires skid along the pavement and "lock" causing the vehicle to go out of control.

It is well known that the greatest braking effect is secured when the wheels of a vehicle are turning rather than when they are "locked" and sliding upon the pavement. Thus, when a tire begins to skid, there is a sudden and substantial decrease in the braking effect and the distance required to stop is correspondingly increased. This decrease in the braking effect results from the decreased coefficient of friction between the tires and the pavement since the friction is much less for sliding a tire along one spot of the surface than for the nearly tearing friction all around the circumference of the tire just prior to skidding. Consequently, it is highly desirable that the vehicle's tires continue to rotate during deceleration and be prevented from "locking" because of the resulting loss of vehicle control, greater stopping distance and excessive wear on the tire by the road surface.

During the deceleration process, any one of the vehicle's brakes may lock due to various conditions such as the road surface under the wheel, the condition of the brake shoes and brake drums, or unequalized braking effects produced by the brake application means. Any or all of these conditions may produce an unbalanced retarding action which may change the direction of movement of the vehicle especially if one of the front or steering wheels "locks."

It is well understood that when one reaches a surface which is slippery by reason of ice, snow, or wetness, the application of the brakes must be eased or the vehicle is likely to skid. Nevertheless, while it is customary for the skilled vehicle operator under such conditions to just momentarily and repeatedly apply the brakes, under emergency or panic conditions even the most skilled operators have the urge to put the full force at their (his) command to stop the vehicle.

In order to overcome such occurrences, many devices have heretofore been proposed for the prevention of skidding which operate independent of the vehicle operator. Most of these devices have, however, required a major reconstruction of the braking system and were not suitable for installation on existing brakes by means of readily installed attachments. Much of the prior art has relied upon governors or massive inertia flywheels while others involved complicated mechanisms or complex electrical or hydraulic devices. These devices increase the number of parts and the likelihood of failure, and a mechanic cannot always readily understand or service them, or visually observe a defect in them.

SUMMARY OF INVENTION

Therefore, the skidding problems and difficulties encountered which result from uncontrollable wheel "lock" and the inherent disadvantages of the prior art are overcome by the present invention in which a novel control valve is employed in any conventional hydraulically controlled brake system operably disposed between the system's brake cylinders and the brake actuating means. In a preferred embodiment of the present invention, the control valve includes a body having a hydraulic fluid input port and an output port internally communicated within the valve housing. Closure means are provided operable to close the fluid communicating passageway responsive to a skidding movement of the wheel and independent of operator action.

Under normal driving and braking conditions, the hydraulic fluid will flow through the valve passageway but under panic or emergency braking conditions the valve means will prevent the application of hydraulic fluid pressure to the wheel cylinders which would normally cause the wheel to "lock."

The closure means in the control passageway comprises a piston assemblage mounted on and responsive to a movable brake backing plate. The closure means are disposed within the valve housing and have a passage therethrough communicating the fluid input port and the fluid output port. A sleeve slidably positioned within the piston passageway is biased into a first open position whereby the input port and output port are in fluid communication. As the vehicle begins to skid, the resulting decrease in friction is sensed by the brake backing plate and transmitted to the piston which is moved forward rapidly, causing the sleeve, by virtue of its inertia, to overcome the biasing means being exerted thereon, thereby closing the passageway and releasing the brake momentarily. When the vehicle has ceased to skid and the wheel again begins to rotate, the sleeve can no longer overcome the biasing means being exerted thereon, whereupon it reopens the passageway. The resultant immediate reapplication of the brake then causes the piston to move back to its original position.

Therefore, it is a primary object of the present invention to provide a novel anti-skid control mechanism susceptible for incorporation into a conventional brake system for vehicles that is not only sensitive to emergency or panic braking conditions but is automatically restored to its normal position upon the cessation of the skidding condition.

It is another object of the present invention to provide a braking mechanism for vehicle wheels so arranged that, while any desired braking force may be applied to the wheel, if the wheel ceases to rotate, the braking force will be relieved and rotation of the wheel maintained, whereby the vehicle will be brought to a stop in the shortest possible time.

It is another object of the present invention to provide braking means for vehicle wheels wherein the maximum braking effort may be applied to bring the vehicle to a stop.

It is another object of this invention to provide an anti-skid braking means comprising a piston-cylinder assemblage wherein the cylinder is immovably mounted on an axial housing or stub and the piston is movably mounted on and responsive to the movement of a brake reaction member for precisely controlling vehicle braking.

It is another object of this invention to provide a novel anti-skid control valve of the character described that incorporates a passage closure means operable in response to changes in the frictional forces produced by the vehicle wheels on the roadway.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 3 is a view similar to that of FIGURE 1 showing the backing plate moved to a position representative of a wheel braking condition;

FIGURE 4 is a view taken along lines 4—4 of FIGURE 3 and showing the braking control valve and associated attachments;

FIGURE 5 is similar to FIGURE 2 and shows the control valve in the closed position.

DESCRIPTION OF THE PREFERRED EMBODIMENT

Figures 1, 2:
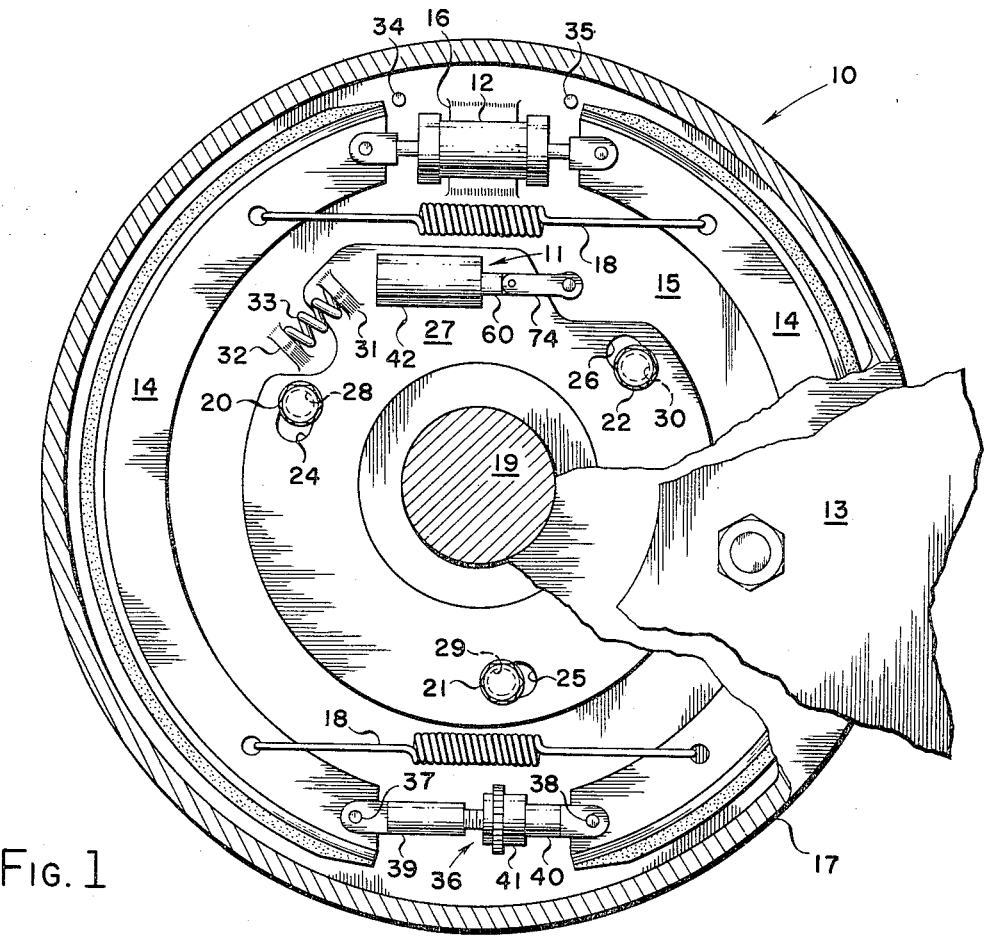
FIGURE 1 is a side elevational view of the novel braking apparatus illustrating a pair of brake shoes mounted on the movable backing plate and the control valve operable in response to backing plate movement.
FIGURE 2 is an enlarged sectional view of the control valve shown in FIGURE 1.

Referring to the drawings in detail and initially to FIGURE 1 thereof, a brake system in accordance with the present invention for a vehicle is diagrammatically illustrated in the general direction of arrow 10 which employs a novel control mechanism 11 of the present invention.

The control mechanism 11 is illustrated in the brake hydraulic line extending between and in fluid communication with a wheel cylinder 12 and a conventional brake actuating means (not shown). Under normal braking action, pressure is applied by the vehicle operator to the brake pedal whereby fluid pressure is exerted on the wheel cylinder 12. The wheel cylinder 12 is employed for braking a wheel 13 by means of expandable brake shoes 14. As fluid pressure is applied, the brake shoes 14, which are supported in any well known manner to a brake backing plate 15, such as by a bracket 16 and cylinder 12, are moved into restricting relationship with the interior surface of a brake drum 17. The rotating wheel 13 is thereupon decelerated until it and the vehicle have stopped. As the hydraulic pressure is relieved by the vehicle operator's release of the brake pedal, return springs 18 act to restore the brake shoes 14 to their disengaged position and thereby free the wheel 13 for further rotative movement.

It is to be understood, however, that although the control mechanism 11 is employed and depicted in controlling one wheel only, it may likewise be employed to control all the vehicle wheels simultaneously or just a selected combination thereof such as the front steering wheels.

The brake backing plate 15 is pivotally mounted to an axle housing 19 by means of conventional fasteners 20–22 such that the brake backing plate 15 may rotate within a preselected arcuate distance determined by the terminating ends of slots 24–26. The axle housing 19 has a flanged section 27 having a plurality of apertures 28–30 therethrough which register with the slots 24–26 when plate 15 is mounted upon the housing 19.

A spring receiving member 31, disposed upon the flanged section 27, is in substantial alignment with a similar spring member 32 on the brake backing plate 15, both said members 31 and 32 being adapted to receive opposite terminating ends of an expansion spring 33.

The relative movement of the brake backing plate 15 to the axle housing 19 is therefore controlled by the terminating ends of the slots 24–26 and the biasing effect produced by the spring 33. Stops 34 and 35 fixedly attached to the axle housing 19 additionally act to prevent the brake shoes 14 and backing plate 15 from pivoting beyond their intended travel and thus provide an additional margin of safety.

A conventional adjustment means 36 is pivotally connected to the brake shoes 14 by fasteners 37 and 38 and permit the brake shoes 14 to be selectively regulated in their relative distance from the brake drum 17. The adjustment means 36 includes first and second connecting members 39 and 40 respectively which are adjustably secured to each other by means of threaded connector 41. As the threaded connector 41 is rotated, the members 39 and 40 are selectively separated or contracted thereby permitting adjustment of the distance between the brake shoes 14 and the brake drum 17.

Referring now more specifically to FIGURE 2, a control valve 42 is shown in cross-section so that the parts and components thereof are more clearly illustrated. The control valve 42 includes a body 44 attached to the flange 27 which is itself rigidly secured to the axle housing 19, said axle housing protruding through an aperture in the brake plate 15. The body 44 includes an input port 46 in fluid communication with the brake actuating means and an output port 48 in fluid communication with the wheel cylinder 12 by means of conduits 50 and 52 respectively.

The valve body 44 also includes an aperture 54 which intercommunicates an interior chamber 56 to the exterior of the control valve 42. A piston 58 is disposed within the chamber 56 such that it is free to move in a reciprocal manner therein.

The piston 58 has a first aperture 59 positioned in the face thereof which is in communication with a hollow rod-like section 60 of the piston 58 thereby forming a conduit 61 which extends throughout the entire length of the piston 58. The section 60 opposite the face of the piston 58 has an internally threaded portion 62 adapted to receive a threaded sealing member 64 which may be adjustably positioned within the threaded portion 62 by any suitable conventional means such as a screwdriver.

Intermediate the threaded portion 62 and the first aperture 59 is a second aperture 66 which intercommunicates the conduit 61 with the output port 48. The aperture 59 is smaller in diameter than the hollow portion of the rod-like section 60 and thus forms a circumferential shoulder 68 at its end opposite the piston face.

Adjacent the shoulder 68 is a hollow sleeve 70 which is biased against the shoulder 68 by means of a spring 72. When biased against the shoulder 68, the sleeve 70 is of insufficient length to close the aperture 66. The outer diameter of the sleeve 70 is such that it is substantially equal to the diameter of the hollow portion of the rod-like section 60 but is sufficiently less to allow it to freely move about when unbiased.

The biasing of the sleeve 70 by the spring 72 is selectively adjustable by the advancing or retreating movement of the threaded sealing member 64, and under normal conditions, the force exerted is comparatively small.

Opposite the face of the piston 58, the rod-like section 60 is movably mounted to the brake backing plate 15 by means of a link 74. The link 74 is rotatably connected to the section 60 and at its opposite end rotatably secured to the brake backing plate 15 such that as the brake backing plate 15 rotates, the link 74 will advance or retract the piston 58 within the control valve 42.

Referring now to FIGURES 3, 4 and 5, the brake backing plate 15 is depicted in a second position with respect to the axle housing 19 occasioned by a braking force applied by he brake shoes 14 bearing against the brake drum 17. The brake backing plate 15 is rotated with respect to FIGURE 1 an arcuate distance as are the brake shoes 14 which are fixedly secured thereto. In this second position, the piston 58 is caused to follow the movement of the brake backing plate 15 as it rotates.

The spring 33 which is preferably a progressive rate spring is compressed during this time and acts to retard rotation of the backing plate 15 and to restore an equilibrium condition. Spring 33 is overcome, however, by the frictional forces exerted by the engagement of the wheel 13 with the ground.

Upon an overbraking condition occurring, wherein the wheel 13 is caused to slide rather than roll upon the ground, the control valve 42 mechanically senses the inertial change resulting from the sliding condition and will move into the position depicted in FIGURE 5.

In operation then, the novel braking system 10 of the present invention will work in the following manner. Under normal driving or braking conditions, hydraulic brake fluid is allowed to flow into the input port 46 of the control valve 42 through the conduit 50. The fluid present within the chamber 56 is introduced to the output port 48 via the apertures 59 and 66 and the section 60. From the output port 48, fluid is supplied through the conduit 52 to the wheel cylinder 12. As pressure is applied to the brake pedal, it is sensed by the wheel cylinder 12 causing movement of the brake shoes 14 against the brake drum 17. During this time, the brake system 10 will move from the position shown in FIGURE 1 to that shown in FIGURE 3.

As the wheel 13 begins to slide, the decreased coefficient of friction, in conjunction with the force exerted by the spring 33, moves the brake backing plate 15 in a sharp and violent counter-clockwise direction as shown in FIGURE 1 and moves the piston 58 into the forward position shown in FIGURE 5 with equal suddeness. The sleeve 70 disposed within the section 60 will, because of its floating relationship therein and because of the lubricating qualities of the brake fluid, tend to remain stationary by virtue of its inertia. As a consequence, the sleeve 70 will cause the spring 72 to momentarily compress against the sealing member 64, thereby closing the aperture 66. Such closure prevents fluid communication through the piston 58 as it continues to move to the left, thereby releasing the pressure in chamber 56' and providing a pressure pulse against the operator's pedal. During this time, springs 18 cause the brake shoes 14 to move away from the brake drum 17 and thus permits the wheel 13 to again begin to rotate. Closure of port 66 by sleeve 70 is only momentary until the biasing spring 72 returns the sleeve against its shoulder 68. As it does, fluid and thereby pressure communication is re-established and brake application resumes immediately so long as operator pressure is on the pedal. As soon as the wheel 13 starts to rotate, the brake backing plate 15 is caused to likewise rotate in a clockwise manner thereby moving the piston back into its normal position and again compressing the spring 33.

In view of the foregoing, it can be seen that the control valve 42 and brake backing plate 15 of the present invention provides precise control and handling of the hydraulic fluid in a conventional brake system in such a manner that the system is rendered immobile during panic braking conditions whereby wheel lock is prevented. By properly adjusting the compression of the spring 72, the force required to bias the sleeve 70 against the shoulder 68 can be controlled while concurrently permitting the sleeve 70 to move against and overcome the force of the spring 72 when the piston 58 is violently moved forward (left) due to rapid changes in brake torque.

It is to be understood that the present embodiment of the invention may be modified by employing an outer annular sleeve in place of the inner sleeve 70. The outer sleeve would function identically to the inner sleeve in that displacement of the outer sleeve about the stem and the aperture formed therein is effected by the violent inertial forces generated by the rapid changes in brake torque. The outer sleeve is resiliently biased in sliding relationship on the stem so that the aperture is normally open to permit fluid communication between the cylinder chambers 56 and 56'.

Although the present invention has been shown and described in the drawing as related to a typical drum brake system, it is clear that the same system with only minor modifications can readily be applied to a disc brake also.

What is claimed is:
1. An anti-skid brake control apparatus for controlling the application of the brakes to a revolving wheel on a vehicle having an axle housing or stub comprising:
   a source of fluid pressure;
   operator controlled means for regulating the pressure delivered from said source of fluid pressure;
   a brake cylinder arranged for pressurization by said souce of fluid pressure;
   brake backing means pivotally connected to said axle housing or axle stub;
   said brake backing means comprising a plate having arcuate slots disposed therethrough for permitting rotative movement of said plate through a predetermined arcuate distance;
   biasing means attached to said axle housing at one of its ends and its other end to said brake backing means so as to resist movement of said brake backing means with respect to said axle housing;
   said biasing means comprising a progressive rate spring;
   valve means disposed intermediate and in fluid com- munication with said source of fluid pressure and said brake cylinder, said valve means being inertially responsive to said brake backing means whereby as said brake backing means is pivoted responsive to wheel skid, said valve means depressurizes said brake cylinder;

said valve means comprising a valve housing having an inlet port and an outlet port and an aperture therethrough, said inlet port being in fluid communication with said source of fluid pressure and said outlet port being in fluid communication with said brake cylinder;

valve closure means disposed within said valve housing, said valve closure means having an exterior portion positioned through said apertures in said valve housing;

said valve closure means comprising:

a hollow piston, said hollow piston having a shoulder portion disposed therein and a first aperture therethrough, said first aperture being in fluid communication with said outlet port of said valve means;

an adjustable sealing member disposed intermediate said first aperture of said hollow piston and said connecting means;

a hollow sleeve disposed within said hollow piston and in fluid communication therewith;

biasing means disposed within said hollow piston intermediate and adjacent said hollow sleeve and said adjustable sealing member whereby when said hollow sleeve is biased against said shoulder by said biasing means near said inlet port, said valve means is in full communication with said outlet port; and connecting means rotatably attached at one of its ends to said extended portion of said closure means and rotatably attached at its other end to said brake backing means whereby as said backing means rotates said valve closure means is responsive thereto.

2. An anti-skid brake control for a vehicle brake system as defined in claim 1 wherein:

said extended portion of said hollowed piston has an internally threaded portion, threadably engaging said adjustment sealing member.

3. In a braking system having a stationary axle housing, a source of fluid pressure, operator controlled means for regulating the pressure delivered from said source of fluid pressure, a brake friction member actuator and brake friction members, the improvement comprising:

a backing plate movably mounted on said axle housing;
stop means cooperatively disposed between said backing plate and said axle housing to limit the movement of said backing plate;

control piston and cylinder assemblage operably connected between said axle housing and said backing plate wherein said piston of said assemblage is movable in response to the movement of said backing plate to control the flow of hydraulic fluid to said actuator and wherein said piston separates a pair of fluid chambers in said cylinder and includes an apertured hollow stem normally in a fluid communicating relationship with said pair of chambers and further including a sleeve slidably carried in the hollow of said stem adapted to relatively close the aperture of said stem upon violent movement of said piston so as to block said fluid communication between said chambers thereby depressurizing said brake actuator.

4. The invention as defined in claim 3 wherein
said piston separates a pair of fluid chambers in said cylinder and includes an apertured hollow stem normally in a fluid communication relationship between said pair of chambers and further including an annular outer sleeve slidably carried about said stem adapted to substantially close the aperture of said stem upon violent movement of said piston responsive to rapid changes in brake torque so as to block said fluid communication relationship between said chambers to depressurize said brake actuator.

5. The invention as defined in claim 3 wherein
said brake backing plate comprises a plate having arcuate slots disposed therethrough for permitting rotative movement of said plates through a predetermined distance.

6. The invention as defined in claim 3 including
biasing means attached to said axle housing at one of its ends and at its other end to said backing plate so as to resist movement of said backing plate with respect to said axle housing.

7. The invention as defined in claim 6 wherein
said biasing means is a progressive rate spring.

References Cited

UNITED STATES PATENTS 2,999,567   9/1961   Adams.
3,369,635   2/1968   Davis.

DUANE A. REGER, Primary Examiner

U.S. Cl. X.R.

303—21